US009631750B1

(12) United States Patent
Veazey

(10) Patent No.: US 9,631,750 B1
(45) Date of Patent: Apr. 25, 2017

(54) APPARATUS FOR ALIGNING ADJOINING PIPE FLANGES

(76) Inventor: Gerald P. Veazey, Richmond, TX (US)

( * ) Notice: Subject to any disclaimer, the term of this patent is extended or adjusted under 35 U.S.C. 154(b) by 870 days.

(21) Appl. No.: 13/476,747

(22) Filed: May 21, 2012

Related U.S. Application Data

(60) Provisional application No. 61/623,976, filed on Apr. 13, 2012.

(51) Int. Cl.
F16L 23/10 (2006.01)
F16L 17/04 (2006.01)

(52) U.S. Cl.
CPC ............. F16L 23/10 (2013.01); F16L 17/04 (2013.01); Y10T 29/49826 (2015.01); Y10T 29/53917 (2015.01)

(58) Field of Classification Search
CPC .. B25B 27/10; F16L 1/09; F16L 23/10; F16L 17/04; Y10T 29/49826
USPC .... 29/271, 272, 237, 467, 243.55, 516, 443, 29/428; 285/24, 35, 367, 336, 420, 364, 285/363, 405
See application file for complete search history.

(56) References Cited

U.S. PATENT DOCUMENTS

| 2,632,942 | A | * | 3/1953 | Berg | F16L 23/02 285/238 |
| 3,422,519 | A | * | 1/1969 | Fehlman | B23K 37/0533 228/44.5 |
| 3,475,038 | A | * | 10/1969 | Matherne | E21B 19/24 285/27 |
| 3,551,983 | A | * | 1/1971 | Newbury | F16L 3/18 228/49.3 |
| 3,851,401 | A | | 12/1974 | Dearman | |
| 4,418,458 | A | * | 12/1983 | Hunter | B21D 39/04 29/237 |
| 4,568,115 | A | * | 2/1986 | Zimmerly | F16L 23/10 24/285 |
| 4,599,778 | A | * | 7/1986 | Dreyfuss | E21B 19/16 29/272 |
| 4,662,055 | A | | 5/1987 | VanMeter | |
| 4,697,830 | A | | 10/1987 | Wood et al. | |
| 5,782,499 | A | * | 7/1998 | Gfrerer | F16L 23/08 285/23 |
| 6,056,332 | A | * | 5/2000 | Foster | F16L 23/10 24/285 |
| 6,568,712 | B1 | | 5/2003 | Aaron, III | |
| 6,708,377 | B2 | * | 3/2004 | Maunder | F16L 23/10 24/279 |
| 6,962,205 | B1 | * | 11/2005 | Lay, Jr. | E21B 33/038 166/241.6 |
| 7,090,254 | B1 | * | 8/2006 | Pietras | E21B 19/16 166/379 |
| 7,467,814 | B2 | | 12/2008 | Kim | |

(Continued)

Primary Examiner — Larry E Waggle, Jr.
Assistant Examiner — Mahdi H Nejad

(57) ABSTRACT

A pipe flange alignment guide to assist in connection of adjoining bolted pipe flanges is described. The guide is comprised of first and second semi-circular body sections joined together by a clamshell hinge and a buckle assembly. Each body section has a flared bottom that forms a conical opening when the body sections are positioned around adjoining flanged pipe segments. The top of each body section forms a semi-circular cover with opening edges having a plurality of spaced apart scallops. The scallops conform to the bolt hole pattern of the adjoining pipe flanges and serve as an alignment guide for the flange attachment bolts.

13 Claims, 5 Drawing Sheets

(56) References Cited

U.S. PATENT DOCUMENTS

| | | | |
|---|---|---|---|
| 7,490,677 B2 * | 2/2009 | Buytaert | E21B 17/10 166/380 |
| 7,703,745 B2 | 4/2010 | Dalluge et al. | |
| 7,832,487 B2 * | 11/2010 | Jensen | E21B 19/24 166/380 |
| 8,245,361 B2 * | 8/2012 | Bouchiat | F16L 21/065 24/279 |
| 8,608,145 B1 * | 12/2013 | Ripple, Jr. | F16L 3/1091 248/74.1 |
| 2005/0258648 A1 * | 11/2005 | Newman | F16L 23/10 285/364 |
| 2006/0049635 A1 | 3/2006 | Brazier et al. | |
| 2008/0007061 A1 * | 1/2008 | Gibb | F16L 17/04 285/364 |
| 2008/0263850 A1 * | 10/2008 | Dwileski | B23K 37/0533 29/464 |
| 2009/0096209 A1 * | 4/2009 | Zilch | F16L 23/06 285/80 |
| 2009/0096210 A1 * | 4/2009 | Maunder | F16L 23/10 285/411 |
| 2009/0127854 A1 * | 5/2009 | Jensen | F16L 13/06 285/421 |
| 2013/0276454 A1 * | 10/2013 | Ainslie | F16D 1/033 60/786 |

\* cited by examiner

APPARATUS FOR ALIGNING ADJOINING PIPE FLANGES

PRIORITY

This application claims priority to U.S. provisional application entitled "Apparatus for Aligning Adjoining Pipe Flanges" bearing Ser. No. 61/623,976 filed Apr. 13, 2012, the entire content of which is hereby incorporated by reference.

FIELD OF INVENTION

This invention relates to the field of connecting pipe segments and, more particularly, relates to a guide apparatus for aligning bolted flange piping assemblies

BACKGROUND OF INVENTION

Piping assemblies are typically constructed by connecting multiple lengths or segments of pipe to form a single pipe conduit. In many instances the ends of each pipe segment are provided with a flange configured with a plurality of bolt holes. A single pipe conduit may be assembled by joining the end flanges of adjoining pipe segments, aligning the bolt holes of the corresponding flanges, and attaching the adjoining flanges together with attachment bolts.

Typically the adjoining flanges and bolt holes are aligned manually which can be time consuming and difficult. Even when lifting equipment is utilized, the adjoining pipe segments must often be manually manipulated to effectively align the flanges and bolt holes of adjoining pipe sections for bolting. Consequently, a need exists for a flange alignment apparatus that may be readily utilized by workers for alignment of adjoining pipe flanges during the construction of bolted flange piping assemblies.

SUMMARY OF INVENTION

The present invention provides an apparatus to align the flanges and bolt holes of adjoining pipe sections to facilitate bolted attachment of the flanges to satisfy the aforementioned need. The apparatus is comprised of first and second semi-circular body sections each having a top end and bottom end. The top end of the first and second body sections has a semi-circular cover section. The bottom end of the first and second body sections has a flared semi-circular skirt section.

The first and second semi-circular body sections are joined together by a clamshell attachment hinge so that the adjoining first and second body sections form a hollow shell having a central opening when the adjoining first and second body sections are closed around a pipe segment and its end flange. A releasable buckle assembly or other releasable attachment device is provided to hold the first and second body sections together around the pipe segment and its end flange. When the first and second body sections are so connected the flared skirt sections of the first and second body sections form a conical bottom section around the pipe and pipe flange.

Arrayed around the edges of top of the semi-circular cover sections of the first and second body sections are provided with a plurality of scallops. The scallops on the edges of the cover sections are curved and spaced apart so that when the body sections are connected together around a pipe segment and its end flange, the scallops of the cover sections conform to the bolt hole pattern of the pipe flange.

In use the first and second body sections of the apparatus are opened apart by pivoting on the clamshell hinge and then placed around a desired first pipe segment and its end flange. The first and second body sections may then be secured together by means of the attachment buckle assembly. Attachment bolts are then placed in each scallop of the now adjoined covers of the first and second body sections whereby the attachment bolts are aligned with the bolt holes of the pipe flange. A second pipe segment having an end flange and bolt hole pattern conforming to that of the first pipe segment may then be inserted into the conical bottom section formed by the adjoining first and second body sections and rotated so that the flange bolt holes are aligned with the attachment bolts already in place. Once the bolt holes of the flange of the second pipe segment are aligned with the attachment bolts, the flanges of the first and second pipe segments are fitted together and held in place by the attachment bolts and corresponding attachment nuts.

DESCRIPTION OF EMBODIMENT

Figure 1A:
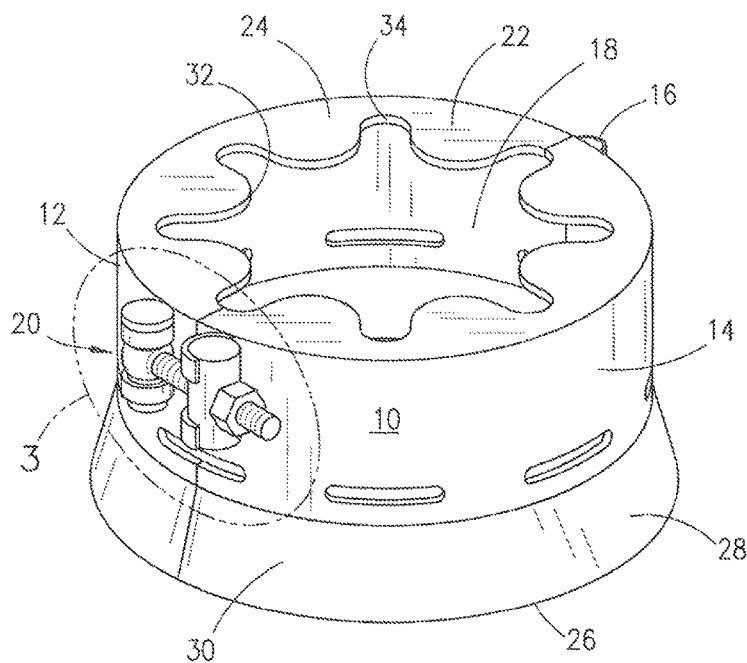
FIG. 1A is a top perspective view of an embodiment of the alignment guide for bolted flange piping assemblies described herein with the flange guide in a closed position.
Figure 1B:
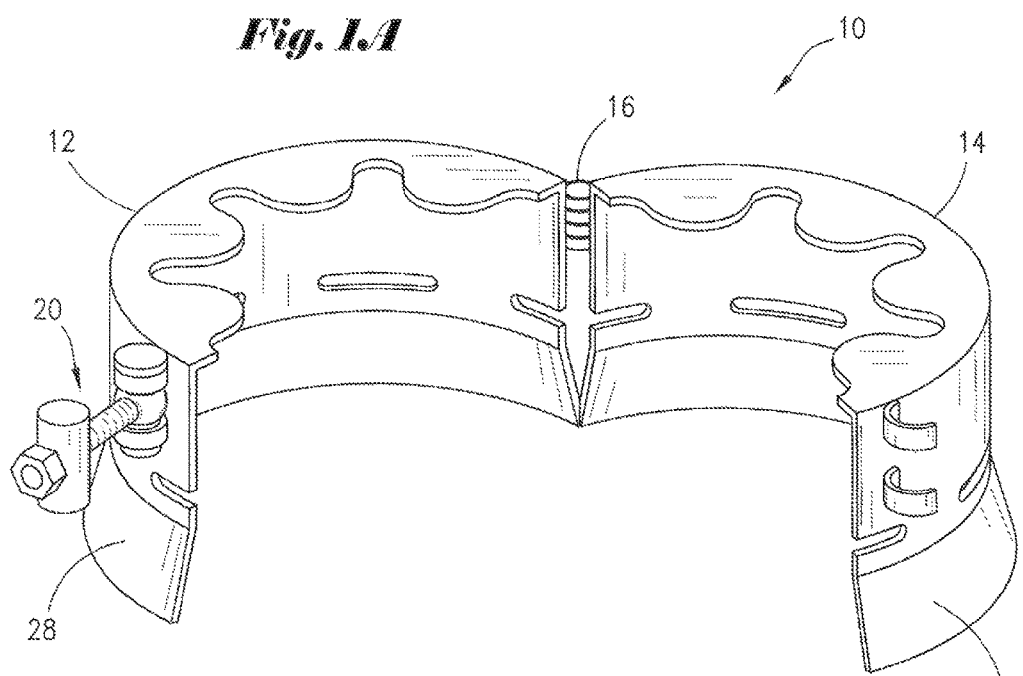
FIG. 1B is a top perspective view of the alignment guide shown in FIG. 1A with the flange guide in an open position.
Figure 2:
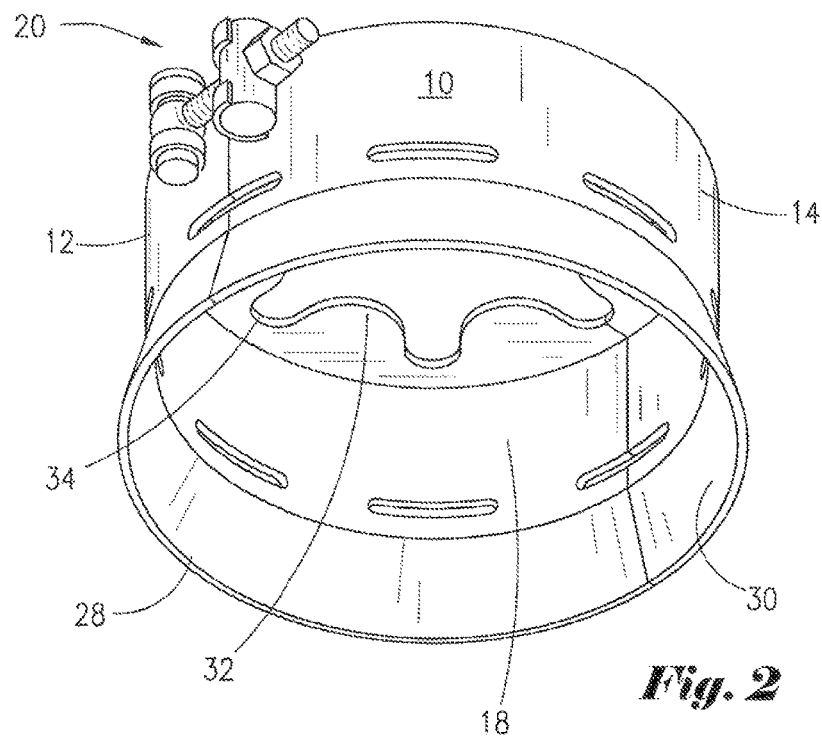
FIG. 2 is a bottom perspective view of the alignment guide shown in FIG. 1A.

Referring now to the drawings, and more particularly to FIGS. 1A through 3, there is shown the proposed the alignment guide apparatus (10) for aligning the flanges and bolt holes of adjoining pipe sections to facilitate bolted attachment of the flanges into create piping assemblies. The apparatus (10) is comprised of a first semi-circular body sections (12) and second semi-circular body section (14). The body sections (12) and (14) are joined together by a clamshell attachment hinge (16) so that a hollow shell having a central opening (18) may be formed when the first body section (12) and second body sections are closed together to form a circle. A releasable buckle assembly (20) or other releasable attachment device is affixed between the body sections (12) and (14) to hold the first and second body sections together.

Each body section (12) and (14) has a top end (22) having a semi-circular cover (24) and a bottom end (26) forming an outwardly flared semi-circular skirt (28). When the first body section (12) and second body section (14) are closed together to form a circle, the outwardly flared skirt (28) of the first and second body sections creates a conically shaped pipe guide section (30) around said central opening (18) which may be positioned around a flanged pipe segment.

The semi-circular covers (24) create a cover edge (32) around the central opening (18) when the first body section (12) and second body section (14) are closed together to form a circle. Each cover edge (32) has a plurality of bolt guides or scallops (34) that are arranged in a predetermined array around the cover edge (32). The scallops (34) on each cover edge (32) are curved and spaced apart in an array so that when the body sections (12) and (14) are connected together, the scallops (34) conform to and correspond with the bolt hole pattern of the end flange of a pipe segment.

Figure 3:
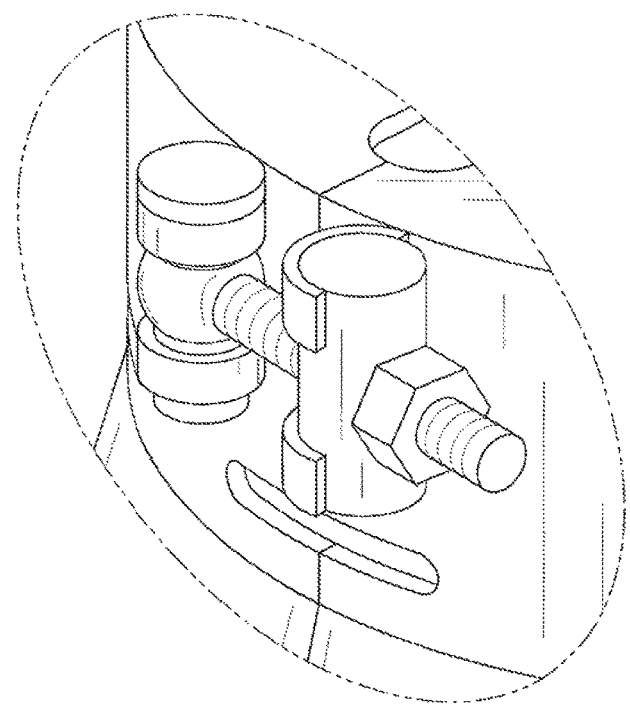
FIG. 3 is a perspective view of the buckle assembly of the alignment guide shown in FIG. 1A.

An embodiment of the buckle assembly (20) is shown in FIG. 3. The buckle assembly (20) is comprised of a threaded bolt (36) attached to a hinge (37) mounted on the first body section (12). A crossbar (38) is slidably mounted the bolt (36) so that it is positionable along the bolt (36). The crossbar (38) is configured to engage with a buckle catch (40). A buckle bolt (42) secures the cross (38) on the catch (40) to hold the first body section (12) together with the second body section (14).

Figure 4:
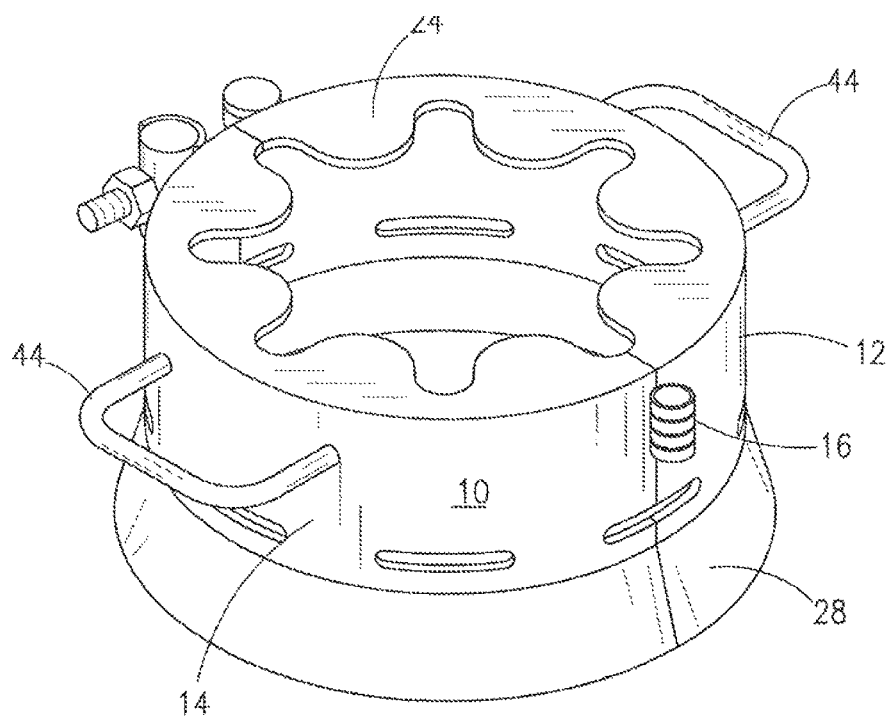
FIG. 4 is a top perspective view of an alternate embodiment of the alignment guide for bolted flange piping assemblies described herein.

As shown in FIG. 4, the apparatus (10) may be adapted by the addition of handles (44) attached to the body sections (12) and (14). The handles (44) will allow a user to more easily manipulate the apparatus (10) when it is being positioned around the end flange of a pipe segment.

The apparatus (10) may be sized as necessary so that the body sections (12) and (14), the covers (24), and the scallops (34) will fit a desired flanged pipe segments or a range of pipe flanged pipe segments. The apparatus (10) may be made of any suitable material including aluminum, steel, metal alloys, or polymers. Because of its simplicity, a user will be able to stock and maintain the apparatus (10) in a variety of differently sized configurations.

Figure 5:
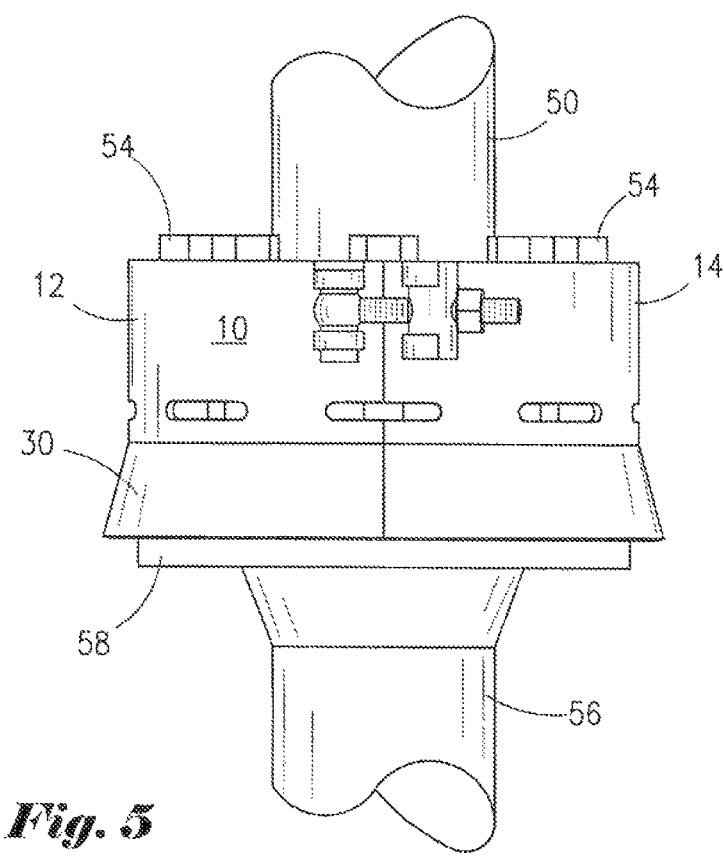
FIG. 5 is an elevation view of the alignment guide shown in FIG. 1A in conjunction with adjoining flanged pipe sections.
Figure 6:
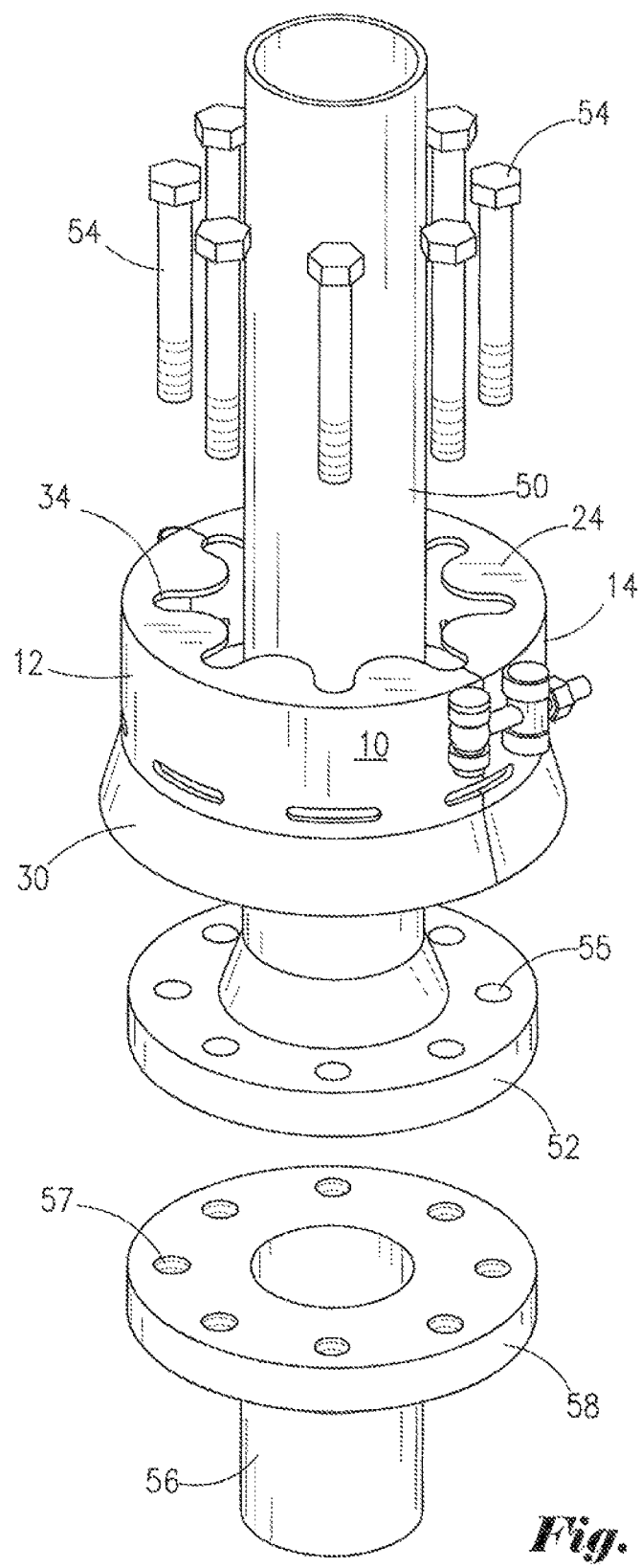
FIG. 6 is an exploded perspective view of the alignment guide shown in FIG. 1A in conjunction with adjoining flanged pipe sections.
Figure 7:
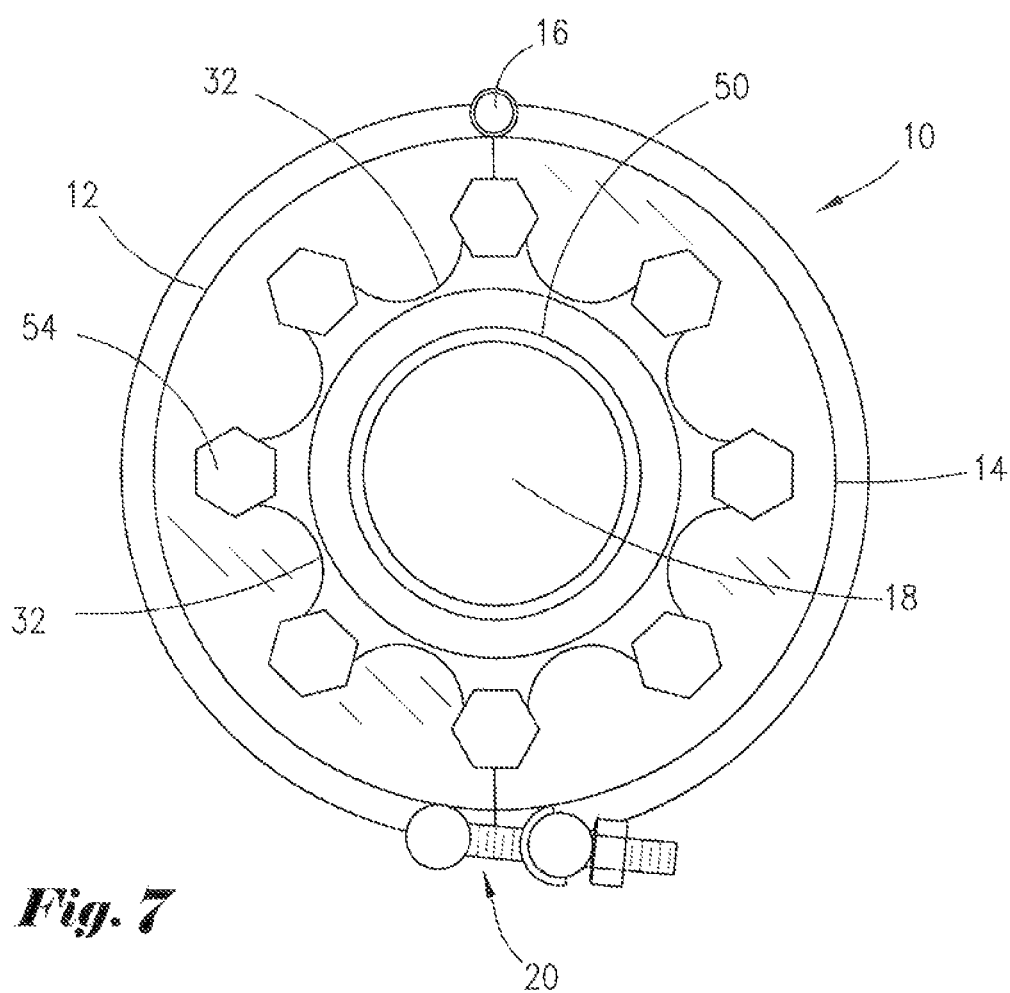
FIG. 7 is a top view of the alignment guide and bolt combination shown in FIG. 5.

FIGS. 5, 6 and 7 show the guide apparatus (10) positioned around in use for alignment of adjoining, flanged pipe segments and their attachment bolts. In use the first body section (12) and the second body section (14) are opened apart by pivoting on the clamshell hinge (16) and then placed around a desired first pipe segment (50) and its end flange (52). The first and second body sections are then secured together around the first pipe segment (50) by means of the attachment buckle assembly (20). Attachment bolts (54) are then placed in each scallop (34) of the now adjoined covers (24) aligned with the bolt holes (55) of the pipe end flange (52). In one embodiment, the handles (44) may be used to aid the alignment of the apparatus (10) with the bolt hole pattern of the end flange (52).

A second pipe segment (56) having an end flange (58) and bolt hole pattern conforming to the bolt hole pattern of the end flange (52) of the first pipe segment (50) is then inserted into the conical pipe guide section (30) of the assembly (10) that was formed by the adjoining first and second body sections together. The second pipe segment (56) is then rotated so that the bolt holes (57) of the end flange (58) correspond and align with the bolt hole pattern of the end flange (52) of the first pipe segment (50). After the bolt holes of the end flanges (52) and (58) are aligned, the attachment bolts are inserted through the bolt holes (57) of the end flange (58) of the second pipe segment (56). The flanges (52) and (58) are then fitted together and held in place by the attachment bolts (54) and corresponding attachment nuts.

It is thought that the proposed apparatus and method presented herein and many of its attendant advantages will be understood from the foregoing description. It is also thought that it will be apparent that various changes may be made in the form, construction and arrangement of the parts and steps of the apparatus and method without departing from the spirit and scope of the invention or sacrificing all of its material advantages. For instance, it can also be seen that the apparatus (10) may be comprised of more than two body sections that are joined together by hinges. For instance, the apparatus (10) could be comprised of a plurality of wedged shaped body sections, each having a scalloped cover section and a flared bottom section. When joined together by hinges, the plurality of wedged shaped body sections will form a circular guide apparatus for alignment of adjoining flanged pipe segments and their attachment bolts in the manner described herein.

What is claimed is:

1. An apparatus for alignment of adjoining flanged pipe segments and attachment bolts comprising:
   (a) a hollow body comprised of at least two body sections, each said body section having a first end and a second end, each said first end of each said body section having a partial pipe guide section and each said second end of each said body section having a partially open cover section;
   (b) a plurality of scallops arrayed around each said partially open cover section;
   (c) a hinge connecting said at least two body sections;
   (d) a buckle whereby said at least two hinged body sections of said hollow body are attached to extend around a first pipe segment with a first end flange having a plurality of first bolt holes thereby creating a pipe guide at said first end of said hollow body and cover with a pipe opening at said second end of said hollow body, whereby said first pipe segment extends through said pipe opening and said pipe guide extends around said first end flange of said first pipe segment;
   (e) an attachment bolt positioned in a desired scallop of said plurality of scallops whereby said desired scallop aligns said attachment bolt to extend through a desired bolt hole of said plurality of first bolt holes of said first pipe segment;
   (f) a second pipe segment having a second end flange positioned within said pipe guide of said hollow body adjacent to said first end flange of said first pipe segment, said second end flange of said second pipe segment having a plurality of second bolt holes corresponding with said plurality of first bolt holes of said first end flange of said first pipe segment; and
   (g) whereby relative rotation between said first pipe segment and said second pipe segment will position said attachment bolt into alignment with a desired second bolt hole of said plurality of second bolt holes of said second flange thereby allowing said attachment bolt to be positioned for attachment of said first end flange of said first pipe segment to said second end flange of said second pipe segment with said attachment bolt.

2. The apparatus as recited in claim 1, wherein an attachment bolt is positioned in each scallop of said plurality of scallops and through each said first bolt hole of said plurality of first bolt holes.

3. The apparatus as recited in claim 1, wherein said buckle is a releasable buckle.

4. The apparatus as recited in claim 1, further comprising a handle attached to each said body section.

5. The apparatus as recited in claim 1, wherein each said partial pipe guide section is conically shaped.

6. In combination with a first pipe segment having a first flanged end with a plurality of first bolt holes and a second pipe segment having a second flanged end with a plurality of second bolt boles, an apparatus for alignment of said first bolt holes of said first flanged end of said first pipe segment with said second bolt holes of said second flanged end of said second pipe segment comprising:

(a) a hollow body comprised of at least two hinged body sections, each said at least two body sections having a first end and a second end;

(b) a pipe guide section at said first end of each said at least two body sections;

(c) a cover section at said second end of each said at least two body sections, said cover section having a semi-circular inner edge;

(d) a plurality of bolt guides arranged in an array along said semi-circular inner edge of each said cover section, said bolt guides arranged to correspond with said first bolt holes of said first flanged end of said first pipe segment and said second bolt holes of said second flanged end of said second pipe segment;

(e) a buckle attaching said at least two hinged body sections of said hollow body around said first pipe segment, whereby said pipe guide sections create a pipe guide around said first flanged end of said first pipe segment whereby said second flanged end of said second pipe segment may be received and whereby said at least two attached body sections with said plurality of bolt guides are rotatably positionable for alignment of said plurality of bolt guides with said first bolt holes of said first flanged end of said first pipe segment;

(f) attachment bolts in said bolt guides of each said cover section whereby said bolt guides align said attachment bolts with said first bolt holes of said first flanged end of said first pipe segment; and (g) whereby placement of said second end flange of said second pipe segment within said pipe guide created by said at least two attached body sections and relative rotation between said first flanged end of said first pipe segment and said second flanged end of said second pipe segment will align said attachment bolts with said second bolt holes of said second flagged end of said second pipe segment.

7. The apparatus as recited in claim 6, wherein said buckle is a releasable buckle.

8. The apparatus as recited in claim 7, wherein said pipe guide section is conically shaped and is comprised of an outwardly flared skirt on each said at least two body sections.

9. The apparatus as recited in claim 8, further comprising a handle attached to at least one of said at least two body sections.

10. An apparatus for alignment of adjoining flanged pipe segments and attachment bolts comprising:

(a) a first semi-circular body section having first and second ends, said first end of said first body section having an outwardly flared skirt section;

(b) a second semi-circular body section having first and second ends, said first end of said second body section having an outwardly flared skirt section;

(c) a semi-circular cover section on said second, end of each said semi-circular body section;

(d) a plurality of scallops arranged in an array around each said semi-circular cover section; said array of said scallops arranged to correspond with a plurality of bolt holes of adjoining end flanges of first and second pipe segments;

(e) a hinge pivotally attaching said first body section to said second body section thereby creating a hollow tubular body with a first end having a conically shaped central opening comprised of said flared skirt sections of said first and second semi-circular body sections and a second end partially covered by said semi-circular cover sections of said first and second semi-circular body sections whereby said first pipe segment, may be enclosed within said central opening of said hollow tubular body to extend through said partially covered second end of said hollow tubular body;

(f) an attachment mechanism whereby said tabular body is rotatably positionable around said first pipe segment;

(g) attachment bolts in said scallops whereby said attachment bolts are aligned by said scallops to extend into said plurality of bolt holes of said end flange of said first pipe segment; and (h) wherein relative rotation between said first pipe segment and said second pipe segment will thereby align said attachment bolts with said plurality of bolt holes of said end flange of said second pipe segment when said end flange of said second pipe segment is positioned within said conically shaped central opening of said hollow tubular body.

11. The apparatus as recited in claim 10, wherein said attachment mechanism includes a releasable buckle.

12. The apparatus as recited in claim 11, Further comprising a handle attached to each said semi-circular body section.

13. The apparatus as recited in claim 11, wherein said attachments bolts are placed through said plurality of bolt holes in said end flange of said second pipe segment whereby said end flange of said first pipe segment and said end flange end of said second pipe segment are fitted together and held in place by said attachment bolts and corresponding attachment nuts.

\* \* \* \* \*